United States Patent Office 3,741,781
Patented June 26, 1973

3,741,781
DRY GRANULES OF NITROCELLULOSE CONTAINING A POLYOL AND METHOD FOR THE PREPARATION OF SUCH GRANULES
Jacques J. Plazanet and Christiane Gaillard, born Letellier, Bergerac, France, assignors to Etat Francais represente par le Ministere d'Etat de la Defense Nationale, Delegation Ministerielle pour l'Armement (Direction des Poudres), Paris, France
No Drawing. Filed Jan. 4, 1971, Ser. No. 103,806
Claims priority, application France, Jan. 9, 1970, 7000350
Int. Cl. C08b 21/12, 21/14, 29/02
U.S. Cl. 106—180
7 Claims

ABSTRACT OF THE DISCLOSURE

This invention relates to dry nitrocellulose granules which are particularly useful for the manufacture of polyurethane varnishes, wherein they contain, in addition to the nitrocellulose, a polyol selected from the group comprising polyoxyalkyleneglycols and in particular polyoxypropyleneglycols with a molecular weight of 800 to 3000 and more, polyesters and polyethers containing free hydroxyl groups capable of reacting with isocyanates, in the proportion of 10 to 30% and preferably 15 to 25% by weight of polyol with respect to the nitrocellulose. The invention also relates to a method of preparation of the abovementioned dry nitrocellulose granules.

---

The present invention relates to dry nitrocellulose granules containing a polyol and method for the preparation of such granules.

Industrial nitrocelluloses are used for modifying the mechanical characteristics and drying properties of polyurethane varnishes.

They have heretofore never been delivered in the dry state, in which they possess explosive properties but always associated with an alcohol or a plasticizer.

Now, these latter compounds are extremely hampering in the manufacture of polyurethane varnishes and must be eliminated from the nitrocellulose before said latter is used. In fact, the single-function alcohols react on the isocyanate groups and prevent cross-linking of these varnishes, whilst the plasticizers have a strong tendency to exudation.

The invention therefore has for its object an industrial nitrocellulose which is particularly useful for manufacturing polyurethane varnishes, such a nitrocellulose being in the form of dry granules, rendered insensitive for transport and handling with the aid of a polyol which may be included in the composition of the polyurethane varnishes.

All types of industrial nitrocellulose may be used in the preparation of such granules. According to the hydroxyl index sought for in the finished product, either a nitrocellulose which is soluble in alcohol, or type A, or a nitrocellulose containing little free hydroxyl groups and therefore soluble in esters, or type B, may be used. To this end, use may be made of the nitrocelluloses of type CA.4A and CA.4E or of any other nitrocellulose whose proporiton of nitrogen is close to 11 for the alcohol-soluble nitrocelluloses or 12 for the ester-soluble nitrocelluloses, this corresponding to degrees of substitution of 1.95 for the CA.4A and about 2.25 for the CA.4E. For each of these types of nitrocellulose, the degree of polymerisation may reach 600. The choice will be made as a function of the desired mechanical properties.

Various degrees of viscosity of nitrocellulose may be included in this preparation. The choice depends upon the physical and mechanical properties which are desired to be obtained for the finished products. The nitrocelluloses of low viscosity type may lead to harder products than the nitrocelluloses of high viscosity type.

The polyols are selected from the group comprising polyoxyalkyleneglycols and in particular polyoxypropyleneglycols with a molecular weight of 800 to 3000 and more, polyesters and polyethers containing free hydroxyl groups capable of reacting with isocyanates, such as for example neopentylglycol polyazelate and ethyleneglycol polyadipate. They are used in the proportion of 10 to 30%, and preferably 15 to 25% by weight of polyol with respect to the nitrocellulose.

The invention also relates to a method for the preparation of the dry nitrocellulose granules of the type described hereinabove, according to which (a) a solution of polyol in a solvent common to the polyol and to the nitrocellulose is placed in contact with (b) a dispersion of nitrocellulose in a mixture of water and said common solvent, possibly in the presence of a protector colloid, in a proportion of 10 to 30%, and preferably from about 15 to 25% by weight of polyol with respect to the nitrocellulose, then the granules of nitrocellulose containing the polyol which are thus formed are recovered.

The protector colloids are selected as a function of the size of the granules desired. Thus, polyvinyl alcohols lead to finer granules than carboxymethylcelluloses and methylcellulose. These protector colloids must be water-soluble.

It is also desirable that the protector colloid be added at the optimum moment of the method. For example, an introduction of the colloid with the solvents brings about the production of relatively finer particles. Thus it is that the introduction of the colloid at the same time as the solvent of the nitrocellulose leads to grains, 92% of which have a size smaller than or equal to 200 microns whilst the introduction of the colloid 15 minutes after the introduction of the solvent of the nitrocellulose leads to grains of which only 70% have a size smaller than or equal to 200 microns.

The quantity of colloid to be used may vary from 0.1 to 3% by weight of colloid with respect to the nitrocellulose used.

Any liquid organic solvent of the nitrocellulose may be used and in a sufficient quantity for obtaining a true dispersion of the nitrocellulose. The preferred solvents are those having a boiling point lower than that of water, or giving an azeotrope having this property. The list of the solvents is not limitative and, by way of example, mention may be made of: ethyl acetate, isopropyl acetate, butyl acetate, methylethylketone, methylpropylketone, etc.

The following examples are given to illustrate the invention without limiting the scope thereof.

EXAMPLE 1

Into a 4-litre glass spherical reactor are introduced 400 g. (dry weight) of low viscosity nitrocellulose of type CA.4E 24, previously wetted with water. 1760 g. of water are added, this weight of water also including the water for wetting the nitrocellulose floss.

900 g. of ethyl acetate are added. The whole is homogenised before adding 100 g. of polypropyleneglycol (molecular weight 2010) diluted in 180 g. of ethyl acetate. After a quarter of an hour of stirring at 20° C., 5.6 g. of carboxymethylcellulose previously dissolved in 200 cm.$^3$ hot water are introduced. Heating is effected with stirring in a water bath and, after 15 minutes, the temperature of the bath is about 85° C. and the distillation of the ethyl acetate/water azeotrope commences.

The azeotrope distills at 72° C. Distillation is continued up to 89° C. and cooled with stirring down to 50° C. The granules are filtered on sintered glass porosity No. 1. They are washed and dried in the drying oven at 85° C. After about 12 hours' drying, the proportion of humidity of the granules is close to 0.8%. The proportion of humidity may be lowered to about 0.1% by a drying of 4 hours under a vacuum of about 4 torr. Yield: 95%, half of the grains (in weight) have a size smaller than 200µ.

EXAMPLE 2

The method described in Example 1 is repeated, but using as protector colloid, instead of carboxymethylcellulose, a polyvinyl alcohol of average viscosity (its aqueous solution at 4% by weight at 20° C. has a viscosity of 25 centipoises), having an ester index of 100 (Rhodovid 25/100 M) and, as polyol, polypropyleneglycol of molecular mass of about 1000. The quantities of products used and the development of the operation are identical to those of Example 1. The granules obtained are particularly fine. About one half possess a diameter smaller than 200µ. Yield: 98.6%.

EXAMPLE 3

There are introduced into a 4-litre glass spherical reactor 400 g. (dry weight) of nitrocellulosic floss of low viscosity type CA.4E 24 which are previously wetted in water. 1760 g. of water are added, this weight of water including the water for wetting the nitrocellulosic floss. 900 g. of isopropyl acetate are added. Homogenisation is effected before the introduction of 100 g. of polypropyleneglycol (molecular weight 1010) diluted in 180 g. of isopropyl acetate. After 15 minutes' stirring, at 20° C., 5.6 g. of methylcellulose previously dissolved in 200 cm.$^3$ hot water are introduced. Heating is effected in a water bath with stirring and the distillation of the azeotrope is effected at 78° C. The distillation is continued up to 92° C. and cooling is effected whilst continuing to stir. The granules are filtered, washed and dried in the drying oven at 85° C. Size of the grains:

26% ≥ 1 mm.
68% ≥ 200µ

EXAMPLE 4

The method of Example 3 is repeated, but replacing the nitrocellulose type CA.4E 24 by high viscosity nitrocellulose type CA.4A 105. In this operation, the stirring is much more lively. In this example, the stirring is about 700 r.p.m., whilst it is only 400 in the other examples. The colloid used is carboxymethylcellulose, the solvent ethyl acetate and the polyol polypropyleneglycol 1010. Numerous agglomerates are observed. The size of 52% of the grains is greater than 1 mm. whilst only 1% of the grains have a size smaller than 200 microns.

EXAMPLE 5

Into a 2-litre glass cylindrical reactor are introduced 200 g. (dry weight) of nitrocellulose CA.4E 24 in the form of floss, previously wetted in water. 880 g. of water are added, this weight including the water for wetting the nitrocellulose floss. 450 g. of ethyl acetate are added. Homogenisation is effected before the introduction of 100 g. of neopentylglycol polyazelate, of molecular weight 2000, diluted in 90 g. of ethyl acetate. After a quarter of an hour of stirring at 20° C., 2.8 g. of carboxymethylcellulose are added which are previously dissolved in 100 cm.$^3$ hot water. Heating is effected in a water bath with stirring. The distillation of the azeotrope is effected at 72° C. under atmospheric pressure. The distillation is continued as well as stirring. The granules are filtered, washed, dried in the drying oven at 85° C., then in vacuo for 3 hours. Yield: 98%. Size of the grains:

73% > 200µ
43% = 200µ

EXAMPLE 6

The method described in Example 5 is repeated, except that the polyol used is a moderately ramified polyester with a base of adipic acid, triol and butyleneglycol, type Desmophene L100. Very good granules are obtained with a yield of 97.9%. Size of the grains:

70% ≤ 400µ
1% > 1 mm.

The method according to the invention, as has just been illustrated, is particularly advantageous as it does not necessitate the evaporation of the solvent. It is therefore more industrial since it makes it possible to avoid stages which are often onerous in the succession of the operations leading to an industrial nitrocellulose in the form of dry granules.

The cellulosic granules obtained according to the invention have numerous applications, particularly those which were known with already known nitrocellulose granules; their character of fineness and homogeneity nevertheless makes them particularly advantageous and they may be used in particular in the manufacture of numerous polyurethanes used in films, varnishes, ground coverings, packings, varnishes on glass, various inks, etc.

From the numerous applications possible, mention may be made of the manufacture of varnishes for wood or metals: for example, an excellent wood varnish is obtained from polypropyleneglycol granules of molecular weight 2000 and the nitrocellulose CA.4E 24 of Example 1.

To this end, a collodion is prepared which contains 80 g. of nitrocellulose granules and 512 g. butyl acetate.

To this are added 48 g. of polypropyleneglycol of molecular weight 2000 so as to obtain a nitrocellulose/polyol ratio equal to 1/1.

1.3 g. of a tri-functional cross-linking agent, such as trimethylolpropane are added.

The preparation of the varnish is terminated by adding, with stirring, 116 g. of polyisocyanate "Desmodur N 75" in the presence of 0.1 g. of stannous octoate. The mixture may be diluted in order to be used in a spray gun.

The pot life of such a mixture is about 2 hours. After application, the layer of varnish obtained is brilliant and very hard. The mixed nitrocellulosepolyurethane varnishes have drying times which are much shorter than the polyurethane varnishes. Similar preparations may also produce translucid films which may serve for numerous uses (packings, etc.).

By using, for example, the preceding preparation, a film of thickness 220µ is obtained having a tensile strength of the order of 3.6 kg./mm.$^2$, an elongation at break of about 23% and a double-ply test of 10.

The films obtained have an excellent resistance to organic solvents, particularly acetone.

They also possess a very good resistance to abrasion, as well as a resistance to the basic concentrated solutions (e.g. caustic soda).

What we claim is:

1. Dry granules of nitrocellulose comprising an admixture of (a) nitrocellulose, and (b) from 10 to 30%, by weight of nitrocellulose, of a polyol selected from the group consisting of polyoxyalkylene glycols and polyesters and polyethers containing a plurality of isocyanate-reactive hydroxy groups.

2. Dry granules of nitrocellulose as defined in claim 1 wherein the polyol is polyoxypropylene glycol of a molecular weight of from 800 to 3000.

3. Dry granules of nitrocellulose as defined in claim 1 wherein there is from 15 to 25% of polyol present.

4. Dry granules of nitrocellulose as defined in claim 1 wherein the degree of substitution in the nitrocellulose is from about 1.95 to about 2.25.

5. A method of preparation of dry nitrocellulose granules as defined in claim 1, wherein a solution of said polyol in a solvent common to the polyol and to the nitrocellulose, said solvent either having a boiling point below that of water or forming an azeotrope with water, is mixed with a dispersion of nitrocellulose in a mixture of water and said common solvent in the presence of from 0.1 to 3%, by weight of nitrocellulose, of a water soluble protector colloid, said common solvent is removed and the nitrocellulose granules thus formed are recovered, washed to remove said protector colloid and dried.

6. A method as claimed in claim 5, wherein the solvent is selected from the group comprising ethyl acetate, isopropyl acetate, butyl acetate, methylethylketone, methylpropylketone.

7. The method as defined in claim 5 wherein the protector colloid is selected from the group consisting of polyvinyl alcohol, carboxymethylcellulose and methylcellulose.

References Cited

UNITED STATES PATENTS

| 3,522,070 | 7/1970 | Webb | 260—13 |
| 2,722,528 | 11/1955 | Johnson | 106—198 |
| 2,843,583 | 7/1958 | Voris | 106—198 |

OTHER REFERENCES

Canadian Paint and Varnish Magazine, December 1948, pp. 18–20.

ALLAN LIEBERMAN, Primary Examiner

U.S. Cl. X.R.

106—181, 188, 189, 195, 198; 260—13, 223